US006833956B2

(12) United States Patent
Lee

(10) Patent No.: US 6,833,956 B2
(45) Date of Patent: Dec. 21, 2004

(54) DIFFRACTIVE STRUCTURE WITH INTERSTITIAL ELEMENTS

(75) Inventor: Robert Arthur Lee, East Burwood (AU)

(73) Assignee: Commonwealth Scientific and Industrial Research Organisation of Campbell, Act (AU)

( * ) Notice: Subject to any disclaimer, the term of this patent is extended or adjusted under 35 U.S.C. 154(b) by 0 days.

(21) Appl. No.: 09/736,736

(22) Filed: Dec. 14, 2000

(65) Prior Publication Data

US 2001/0043396 A1 Nov. 22, 2001

Related U.S. Application Data

(63) Continuation of application No. PCT/AU99/00520, filed on Jun. 29, 1999.

(30) Foreign Application Priority Data

Jul. 2, 1998 (AU) .............................................. PP4444

(51) Int. Cl.[7] ................................................ G02B 5/18
(52) U.S. Cl. ........................................... 359/567; 359/2
(58) Field of Search ........................... 359/2, 566, 567, 359/569, 572, 24; 283/86

(56) References Cited

U.S. PATENT DOCUMENTS

| 5,138,604 A | * | 8/1992 | Umeda et al. ............... 369/103 |
| 5,853,197 A | * | 12/1998 | Mowry, Jr. et al. ........... 283/91 |
| 5,991,078 A | * | 11/1999 | Yoshitake et al. ........... 359/567 |
| 6,271,967 B1 | * | 8/2001 | Stork ........................ 359/567 |
| 6,359,734 B1 | * | 3/2002 | Staub et al. ................ 359/572 |

FOREIGN PATENT DOCUMENTS

| WO | WO 9504948 | 2/1995 |
| WO | WO 9611114 | 4/1996 |

* cited by examiner

*Primary Examiner*—Mark A. Robinson
*Assistant Examiner*—Alessandro Amari
(74) *Attorney, Agent, or Firm*—Ladas & Parry LLP

(57) ABSTRACT

A diffractive device has a surface relief structure which, when illuminated by a light source, generates one or more diffraction images which are observable from particular ranges of viewing angles around the device. The device includes background diffractive structural elements and interstitial diffractive structural elements. The interstitial elements are interspersed between the background elements such that the diffractive action of the background elements is modulated by the interstital elements, with differing interstitial element configuration in differing parts of the surface relief structure producing differing diffraction effects in corresponding parts of the diffraction images.

41 Claims, 10 Drawing Sheets

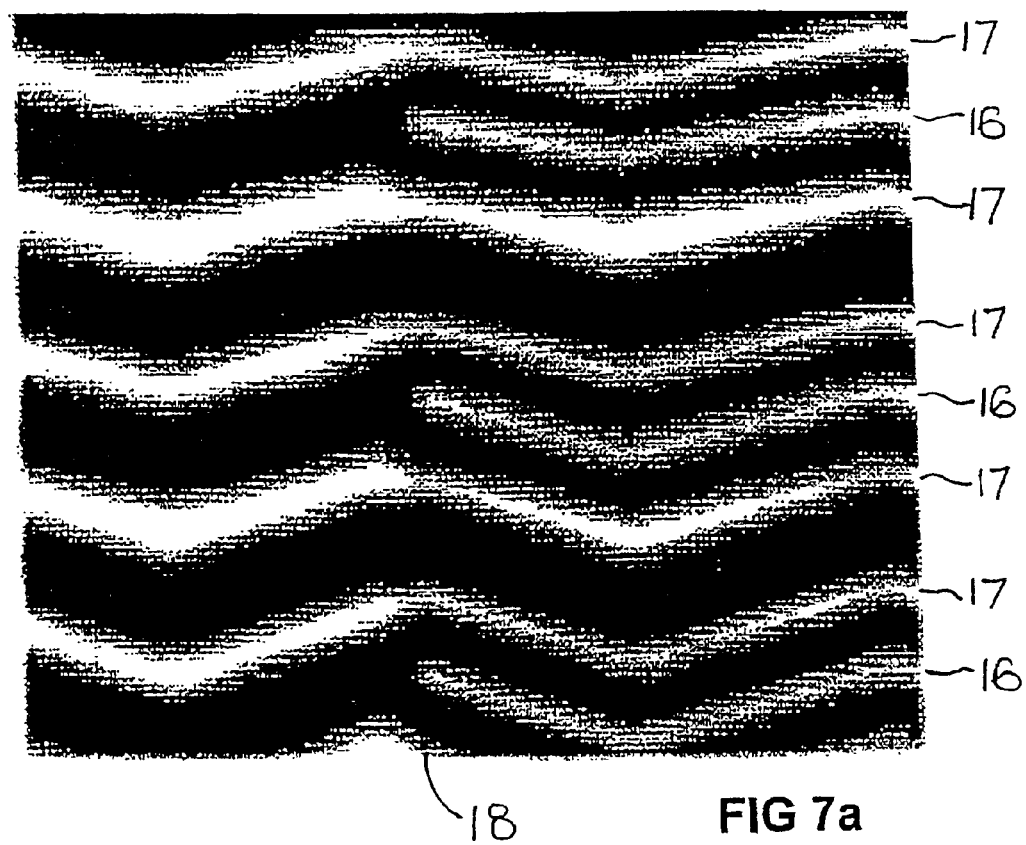
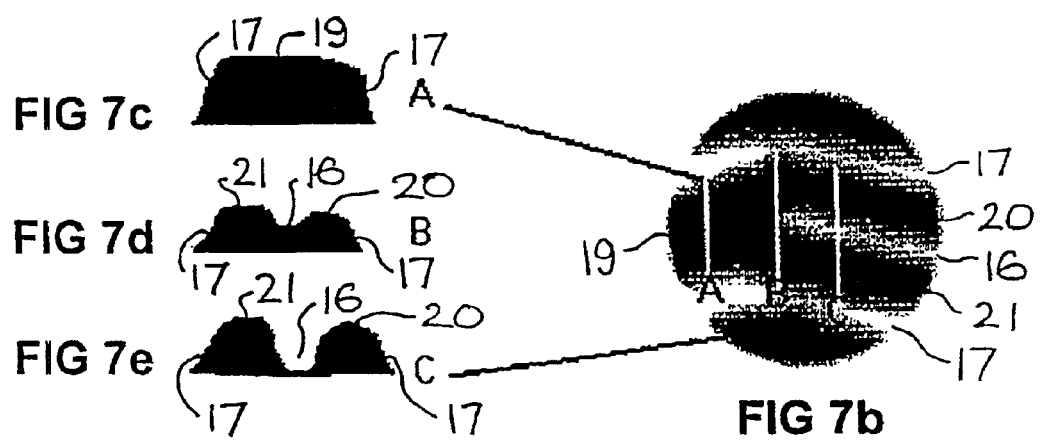

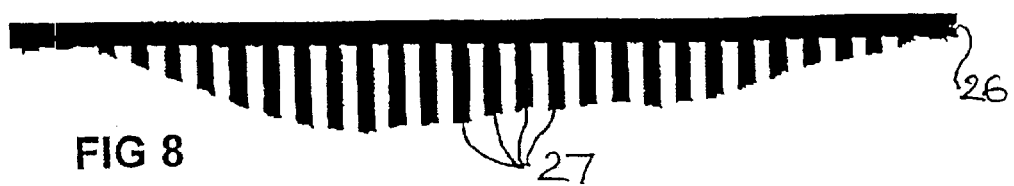
FIG 8
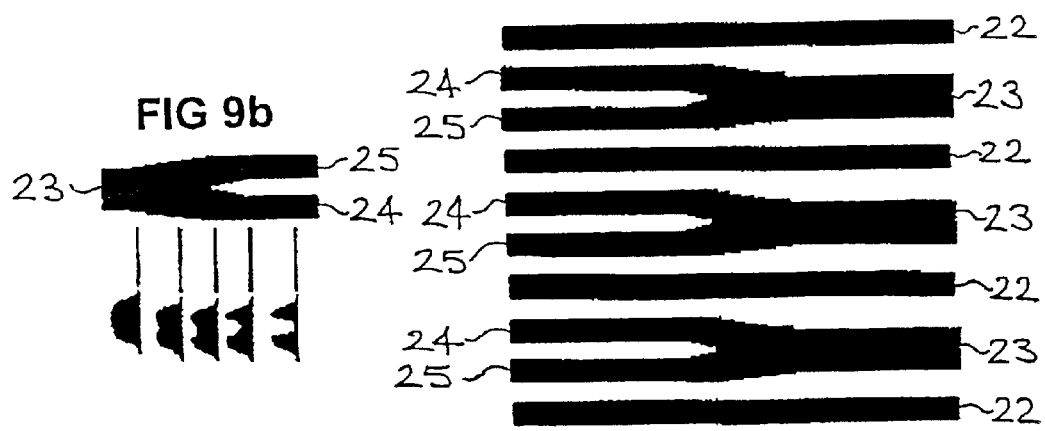
FIG 9b
FIG 9a
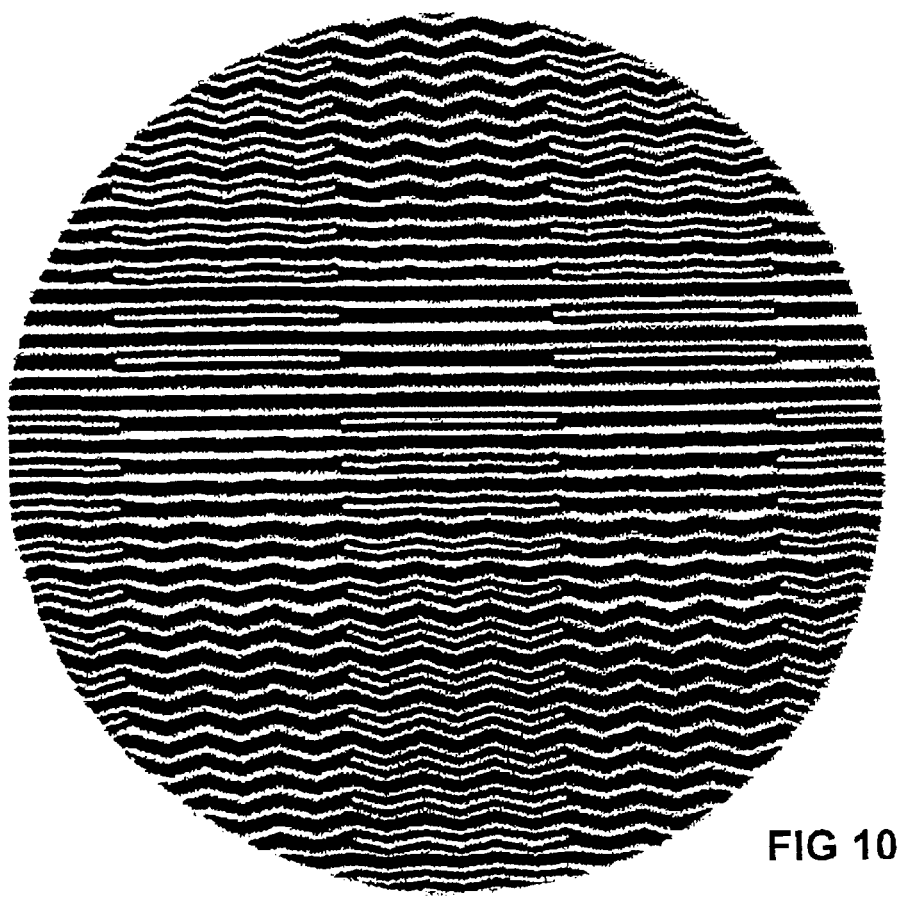
FIG 10

DIFFRACTIVE STRUCTURE WITH INTERSTITIAL ELEMENTS

This is a continuation of PCT/AU99/00520 filed Jun. 29, 1999.

This invention relates to diffractive devices which generate diffraction images when illuminated by a light source. It relates particularly to diffractive devices or "optically variable devices" (that is, devices which appear different when observed from different angles or under different illumination conditions) which incorporate in their surface relief structures a new type of diffractive element, hereinafter referred to as "interstitial elements".

Throughout this specification including the claims, the terms "diffraction", "diffractive" and "diffracted" have the meaning that includes the process whereby electromagnetic radiation in the form of light waves is scattered either coherently, incoherently, diffusely, reflectively and/or specularly from surface relief elements of the device in the form of ridges, grooves, troughs, indentations and/or protrusions of spatial and depth and/or height dimensions of extent greater than 0.05 microns, and the wavelength range of the incident and diffracted light is any single or multiple combination of wavelengths in the range of from 0.1 microns to 15 microns.

There are numerous different uses for diffractive devices of the type to which this invention relates. One common use is as a security element on banknotes, cheques, credit cards, share certificates, computer software and other valuable documents and objects. Diffractive devices are typically created by embossing a diffractive surface relief structure into metallised foil which is then adhered to the document or object, in such a way that the device cannot be removed without destroying it. In some cases, the diffractive structure can be embossed directly into the document or object. Optically variable structures cannot be photocopied, because a photocopy does not possess the optically variable characteristics of the original.

One common type of optically variable device is a hologram. Coherent laser radiation is split into two beams, one of which is directed at an object. Light reflected from the object is combined with the other beam to create an interference pattern, which is then embossed into a surface. When the surface is subsequently illuminated, an image of the object is observed. Holograms have been used on Visa™ and MasterCard™ credit cards since 1984.

Holograms are best observed under a single point source of light. However, credit cards are normally used in diffuse lighting conditions, such as in general daylight or under multiple fluorescent lights. As a consequence, the image observed is typically blurred and indistinct. A poor quality counterfeit hologram could therefore conceivably be passed off as an original.

Another type of optically variable device is a diffractive device composed of numerous straight-line grating elements. Straight-line gratings (and concentric circular gratings) can be produced by interference between two coherent laser beams. Parallel lines are written concurrently by the interference pattern. Kinegram™ devices provide examples of optically variable devices using such technology. Relevant patent publications include European Patents 105099, 330738 and 375833. Kinegram™ devices were used on the Saudi Arabian passport in 1987 and on the Austrian 5000 Schilling banknote in 1990.

An advantage of straight-line grating devices is that they provide much brighter colours than holograms, and they have considerably clearer visual effects. However, because of the diffractive properties of straight line gratings, each effect is observable only from a very narrow range of viewing angles. Moreover, standard straight line gratings are useful only for producing line-art graphics and not for portraiture which requires more flexibility in terms of grey-scale and colour effect selection.

Another type of diffractive device is the Catpix™ device, used on the Australian ten dollar plastic banknote issued in 1988. The Catpix™ diffractive structure consists essentially of continuous undulating lines which extend throughout the device or a substantial portion of it. The surface area is divided into notional pixels, and at each pixel the undulating lines come together to form an optical catastrophe region, which is observed by the viewer as a point of light with a fixed brightness value which depends on the spatial frequency of the lines at the catastrophe region. The points of light combine to form a diffraction image which is seen by the observer. In the case of the 1988 ten dollar note, the image was a portrait of Captain Cook.

Catpix™ diffractive devices, details of which were published in European Patent Publication EP 044 9893 B1 (the contents of which are hereby incorporated herein by reference) are made using computer-controlled electron beam lithography. Each line or groove in the diffraction pattern is written individually by an electron beam. This enables precise control over the positioning and shape of each diffractive element.

Pixelgram™ diffractive devices are based on an actual division of a surface relief structure into separate squares or pixels. Each pixel forms a separate diffraction grating, which may consist of straight lines or curved lines, and is responsible for generating a single point of light with a particular grey-scale and/or colour value in the diffraction image. Details of Pixelgram™ technology have been published in European Patent Publication 049 0923 B1 (the contents of which are hereby incorporated herein by reference). As is the case for Catpix™ devices, Pixelgram™ devices are constructed using computer-controlled electron beam lithography.

An advantage of Pixelgram™ devices over Catpix™ devices is that the whole of each pixel area on the Pixelgram™ device contributes to the light point generated by that pixel, whereas only the catastrophe region of a Catpix™ notional pixel contributes to the corresponding light point. Another advantage is that pixels may have radically different orientations from those of surrounding pixels, so that more than one diffraction image can be generated simultaneously. However, there are inevitable discontinuities between adjacent pixel gratings, and these result in extraneous diffuse scattering effects. Diffuse scattering from the edges of pixels has the effect of reducing the brightness of the observed optical effects, particularly for very small pixel sizes. Moreover, because of the clear separation between pixels, it is potentially easier for a person to decode the optical effects mechanisms of Pixelgram™ structures than Catpix™ structures, using microscopic examination of the structures.

Exelgram™ diffractive devices consist of diffractive elements arranged in tracks. Diffractive elements, which may be grooves, ridges, or polygonally shaped indentations or protrusions, are arranged in substantially continuous configuration along the tracks. Details of Exelgram™ technology have been published in U.S. Pat. No. 5,825,547 (the contents of which are hereby incorporated herein by reference). As is the case for Catpix™ and Pixelgram™ devices, Exelgram™ devices are typically created using electron beam lithography.

Exelgram™ devices, which were first used on Australian opal stamps in 1995 and American Express Travellers' cheques in 1997, overcome part of the extraneous diffuse scattering effect problem apparent in Pixelgram™ devices; however, there are still extraneous diffuse scattering effects caused at the interface between tracks.

According to the present invention, there is provided a diffractive device having a surface relief structure which, when illuminated by a light source, generates one or more diffraction images which are observable from particular ranges of viewing angles around the device, including:

background diffractive structural elements; and
interstitial diffractive structural elements;
wherein the interstitial elements are interspersed between the background elements such that the diffractive action of the background elements is modulated by the interstitial elements, with differing interstitial element configuration in differing parts of the surface relief structure producing differing diffraction effects in corresponding parts of the diffraction images.

In one arrangement, at least some of the background elements may consist of a multiplicity of continuously connected individual ridge or groove segments, with ridge or groove segments in adjacent background elements being arranged in an approximately parallel configuration. In this arrangement at least some of the interstitial elements consist of individual or bifurcated ridge or groove segments interspersed between the background elements, with interstitial element ridge or groove segments being approximately parallel to ridge or groove segments in adjacent background elements.

In an alternative arrangement, at least some of the background elements may be approximately parallel, each consisting of a plurality of discontinuous individual ridge or groove segments. In this arrangement, at least some of the interstitial elements are approximately parallel to each other, each consisting of one or more ridge or groove segments and each being located in a discontinuity in a background element. Some of the interstitial elements may be oriented generally at right-angles to the general orientation of the background elements, in order to provide one or more images which are observable from positions at right-angles to the positions from which images produced by the background elements can be observed.

The interstitial elements may be separate structural elements, or they may be joined to other structural elements. It is preferred that at least some of the interstitial elements are connected smoothly to adjacent interstitial elements and/or background elements in one or more of the following ways:

(a) a single interstitial element bifurcates smoothly into two interstitial elements;
(b) two interstitial elements join smoothly into a single interstitial element;
(c) an interstitial element joins smoothly into a background element;
(d) an interstitial element of a particular depth and width transitions smoothly into an interstitial element of a different depth and width;
(e) an interstitial element of a particular shape and/or curvature transitions smoothly into an interstitial element of a different shape and/or curvature;
(f) an interstitial element with a particular angular orientation relative to the background elements joins smoothly to an interstitial element having a different angular orientation.

Similarly, some of the background elements may be connected smoothly to adjacent background elements and/or interstitial elements in one or more of the following ways:

(a) a single background element bifurcates smoothly into two background elements;
(b) two background elements join smoothly into a single background element;
(c) a background element joins smoothly into an interstitial element;
(d) a background element of a particular depth and width transitions smoothly into a background element of a different depth and width;
(e) a background element of a particular shape and/or curvature transitions smoothly into a background element of a different shape and/or curvature;
(f) a background element with a particular angular orientation relative to other background elements joins smoothly to a background element having a different angular orientation.

The background diffractive structural elements and the interstitial diffractive structural elements may have any suitable shapes and configurations. It is preferred that each of the background elements and the interstitial elements has a shape which is one or more of:

(a) a straight, curved or undulating groove;
(b) a straight, curved or undulating ridge;
(c) an array of dot-shaped indentations or protrusions; or
(d) a polygonally shaped indentation or protrusion.

As indicated above, the interstitial element configuration is responsible for the particular optical effects produced by the surface relief structure. It is preferred that the diffraction effects observed in a particular part of the image are determined by the interstitial element configuration in a corresponding part of the surface relief structure, and the interstitial element configuration features include:

(a) lengths of interstitial elements;
(b) widths of interstitial elements;
(c) depths and/or heights of interstitial elements;
(d) local spatial frequency of interstitial elements;
(e) degree of curvature of interstitial elements;
(f) shape of interstitial elements; and
(g) shapes of joins between adjacent interstitial elements.

In order to produce particular optical effects, the interstitial elements in a particular region may all have the same shape, orientation and spatial frequency. However, in order to achieve other types of effects, the interstitial elements may vary continuously in terms of orientation, curvature, thickness and/or shape, the variations being a means by which image information is encoded into the surface relief structure.

In a typical arrangement of the present invention, the background to elements generate a "carrier wave" and the interstitial elements modulate the carrier wave according to the information which is encoded into them.

The interstitial elements may be oriented in any suitable manner relative to the background elements. It is preferred that at least some of the interstitial elements are oriented generally parallel to the background elements. It is also possible that at least some of the interstitial elements are arranged in a comb-like configuration, with the teeth of the comb being oriented at right angles or at an angle oblique to the general orientation of the background elements. Alternatively or additionally to the comb-type configurations, at least some of the interstitial elements may be arranged in groups oriented at right angles or obliquely to the general orientation of the background elements, such that a cross-section through the group has a periodic or sinusoidal shape of many repeating periods or oscillations. In general, a group of parallel diffractive elements produces a diffraction effect which is observable from a direction perpendicular to the orientation of the diffractive elements. Thus a surface relief structure which includes both interstitial elements arranged parallel to the background elements and interstitial elements arranged at right angles to the background elements will produce at least two different images, observable from directions which are at rights angles to each other. Interstitial elements arranged in other oblique orientations will produce diffraction effects observable from correspondingly different directions.

It is preferred that at least some of the interstitial element configurations are designed to create grey-scale or variable image intensity information in the image, and one or more of the following configuration features give rise to the grey-scale or variable image intensity information:

(a) lengths of interstitial elements;
(b) degree of curvature of interstitial elements;
(c) widths of interstitial elements and shapes of joins between adjacent elements;
(d) local slope or angle of interstitial elements.

It is further preferred that at least some interstitial element configurations are designed to create colour information in the image. Colour information is typically dependent on the spatial frequencies of the interstitial elements (the number of substantially parallel diffractive elements per unit of distance).

The background elements may be of any suitable shape and configuration. It is preferred that the background elements are in one or more of the following configurations:

(a) straight, equally spaced background elements;
(b) straight, variably spaced background elements;
(c) undulating, equally spaced background elements;
(d) undulating, variably spaced background elements;
(e) equally spaced closed or open elliptically shaped background elements;
(f) variably spaced closed or open elliptically shaped background elements;
(g) zig-zag shaped background elements of variable zig or zag angle.

In some embodiments of the invention, the surface relief structure may generate two or more diffraction images which are observable from different ranges of viewing angles. In such embodiments, some regions of the surface relief structure contribute to one of the images, and other regions contribute to another of the images.

The limit of resolution of a human eye when viewing an object at close quarters is typically about 0.25 mm. It is desirable that at least some component parts of images generated by the surface relief structure be smaller than this so that the images appear smooth. There are also security advantages to having components such as microwriting and micrographics which are too small to be observed except with a magnifying glass or microscope. It is therefore preferred that at least some of the interstitial elements have lengths of less than 0.25 mm. It is especially preferred that some elements have dimensions in the range of 4 to 30 micron. On the other hand, it is preferred that at least some of the background elements have elements extend throughout the length or width of the surface relief structure.

In addition to the features discussed above, there are numerous items which can be incorporated into the surface relief structure. In some arrangements, the surface relief structure may include between background elements one or more of the following:

(a) small scale text or graphics indented into or protruding from the surface relief structure;
(b) interstitial elements consisting of parallelograms of varying angular orientations indented into the surface relief structure;
(c) diffusely reflecting randomly distributed interstitial elements;
(d) diffusely reflecting trapezoidal interstitial elements.

It will be appreciated that the present invention has several advantages over the prior art Hologram, Kinegram™, Catpix™, Pixelgram™ and Exelgram™ structures. These include:

(a) The background diffractive structural elements provide a "carrier wave" which has continuous connectivity throughout the structure, thereby minimising the diffuse scattering edge effects when compared to similar effects that arise from the edges of the pixels in Pixelgram™ and Kinegram™ structures and along the edges of tracks in Exelgram™ structures. Diffuse scattering effects from the edges of pixellated devices of very small pixel size have the effect of reducing the brightness of the observed optical effects.

(b) The interstitial structural elements are located within the area of the background "carrier wave" structural elements, so the optical characteristics of each region are the result of a complex interaction between the diffractive properties of both the interstitial elements and the background structural elements. This embedding of interstitial elements within a continuous background structural element pattern makes it much more difficult to de-code the optical effects mechanisms from a microscopic examination of the surface relief structure. The surface relief structure is therefore more secure with respect to attempted re-origination by reverse engineering of the optical microstructure.

(c) Since the background structural element pattern is continuous in both directions, the image resolution of any image encoded into the microstructure is determined by the relative sizes of the interstitial element regions. The size of each interstitial region is determined by the number of interstitial elements and the lengths of these elements, and these are continuously variable. Thus the microstructure has the unique property that the encoded image resolution is continuously variable throughout the surface relief structure.

(d) Interstitial "doping" of a continuous background structural element pattern by a multiplicity of structural element "filaments" of variable length, width, curvature and depth allows for the incorporation of a much greater range of specialised optical security effects at a much smaller scale when compared to diffractive microstructures based on a pixellated format. The fundamental optical information unit in the present invention is a structural element, whereas in pixellated devices the fundamental optical information unit is a pixel consisting of a relatively large number of structural elements. Hence interstitial element structures offer the possibility of designing "optically variable device" images with much higher resolution optical effects.

(e) Because interstitial element microstructures require individual fabrication of each groove element, the fabrication of the microstructure requires advanced electron beam lithography or some other advanced method. Holographic origination is not possible, so the availability of the technology is much more restricted, and security printing industry requirements for controlled access to the technology are much more achievable.

Although the invention has been described above primarily with reference to application in providing visually observable images, the invention also has application to machine-readable data and security applications. Machine-readable digital information may be encoded into the positioning, length, orientation and/or other physical characteristics of interstitial elements, such that the information may be read by passing a laser over the interstitial elements and analysing and decoding the reflected light.

The invention will hereinafter be described in greater detail with reference to the attached drawings which show example forms of the invention. It is to be understood that the particularity of those drawings does not supersede the generality of the preceding description of the invention.

FIG. 6b shows a magnified view of a part of FIG. 5a.

FIG. 7a shows a magnified view of a groove bifurcation area, and FIGS. 7b to 7e show the nature of the bifurcation in more detail.

FIG. 8 illustrates a comb-like collection of interstitial elements.

FIGS. 9a and 9b provide further illustrations of groove bifurcation.

FIG. 10 is a representation of a region of a surface relief structure according to a further embodiment of the invention.

FIGS. 11a to 11d provide illustrations of interstitial elements being added in to background elements according to one arrangement of the invention.

FIGS. 12a to 12d illustrate "right angle" interstitial elements being added in to background elements according to one arrangement of the invention.

Figure 13:
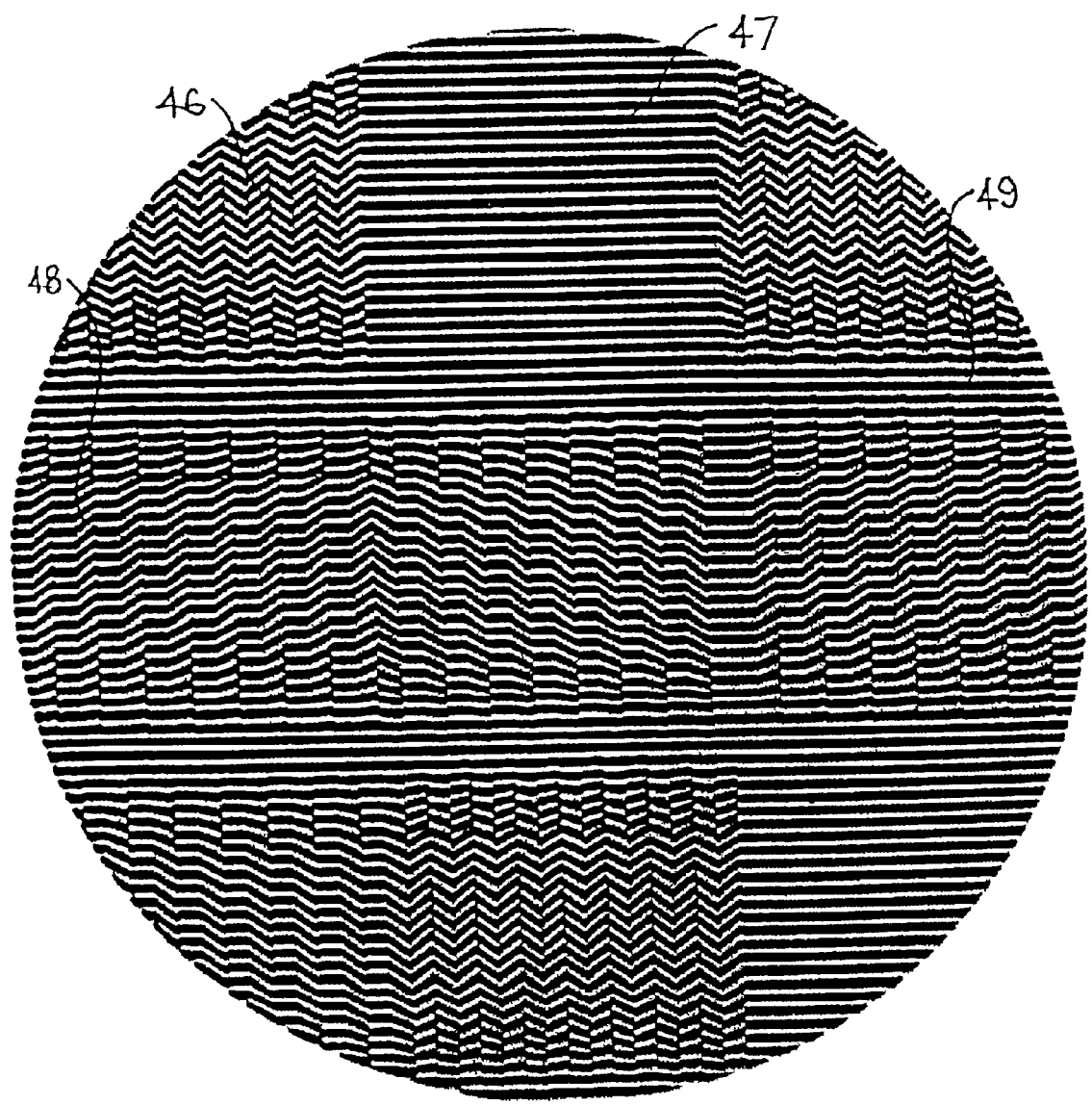

FIG. 13 is a representation of a region of a surface relief structure incorporating numerous interstitial elements according to an embodiment of the invention.

Figure 14:
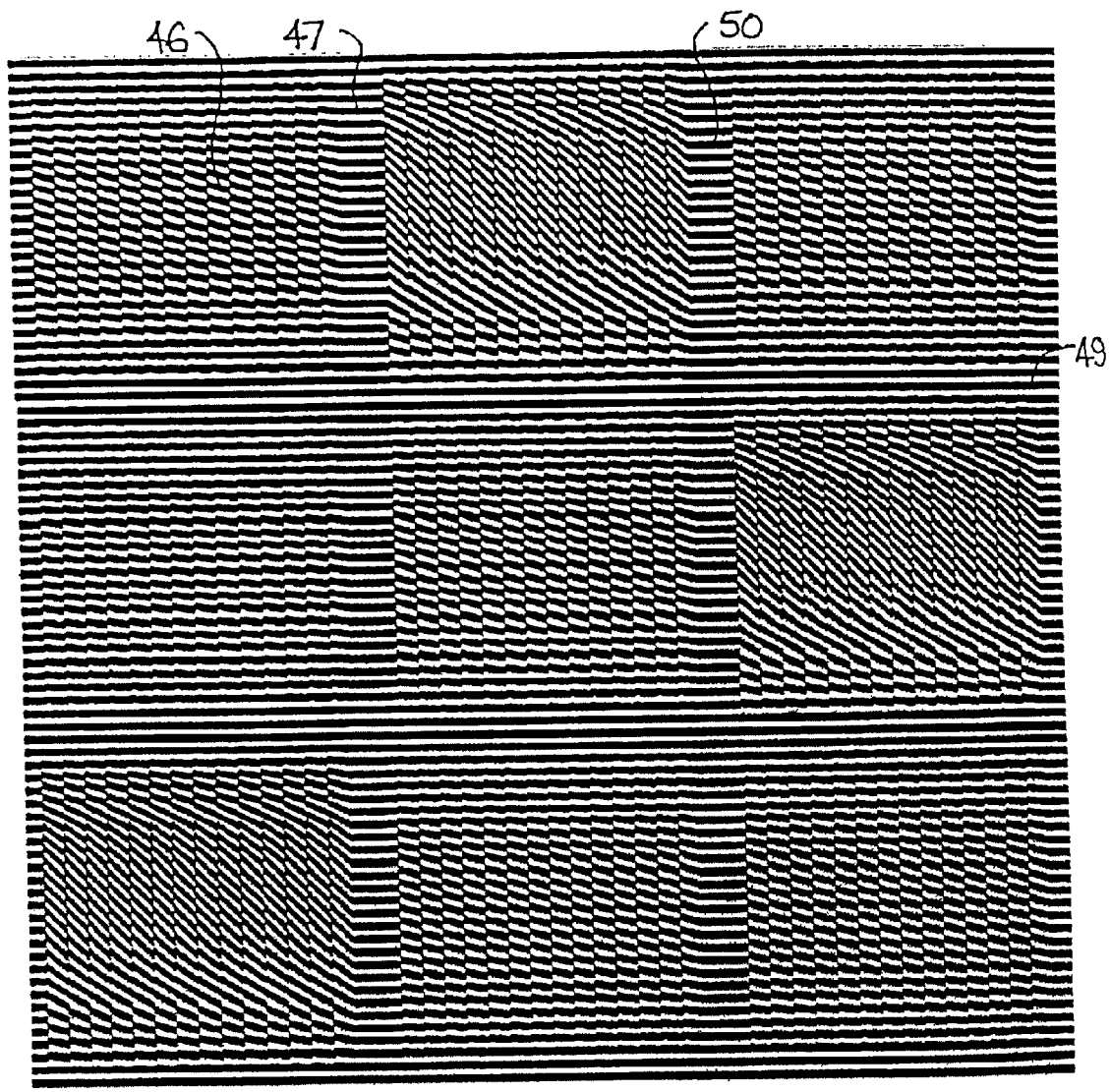

FIG. 14 is a representation of another region of a surface relief structure incorporating numerous interstitial elements according to an embodiment of the invention.

Figure 15:
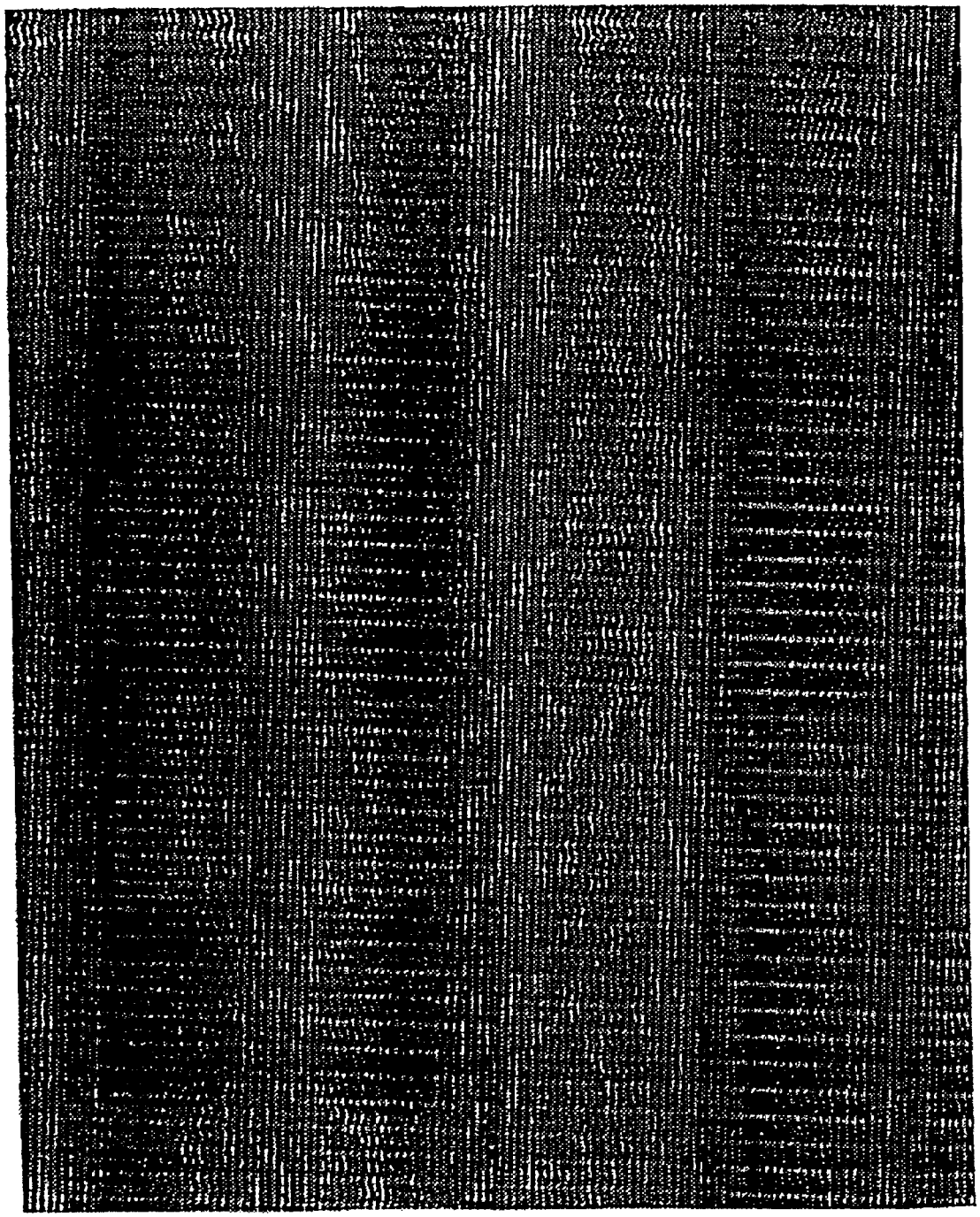

FIG. 15 is a greatly enlarged image of a surface relief structure formed according to an embodiment of the invention.

For the sake of convenience, all of the examples in FIGS. 1 to 14 have been illustrated as black-and-white line drawings. In reality, the examples are three-dimensional surface relief structures, typically with a single colour throughout. Accordingly, the sharp distinction between black and white shown in the drawings is not present in the surface relief structures and is merely intended to contrast schematically the tops of ridges with the bottoms of grooves. This mode of representation is less than perfect because it does not allow for differing depths of grooves. Furthermore, for the sake of clarity the background and interstitial elements shown in the drawings have been limited to grooves and ridges; whereas they make equally well consist of other diffractive shapes including dot-shaped indentations and protrusions and polygonally shaped indentations and protrusions.

Figure 1:
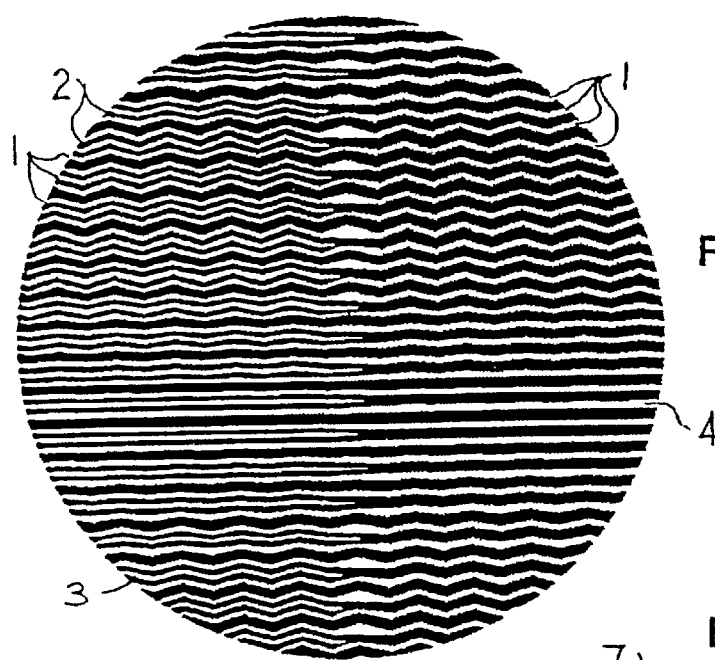
FIG. 1 is a representation of a region of a surface relief structure according to an embodiment of the invention.

Referring firstly to FIG. 1, there is shown a portion of surface relief structure from a diffractive device which, when illuminated by a light source, generates a diffraction image which is observable from particular ranges of viewing angles around the device, including:

background diffractive structural elements 1; and
interstitial diffractive structural elements 2;
wherein the interstitial elements 2 are interspersed between the background elements 1 such that the diffractive action of the background elements 1 is modulated by the interstitial elements 2, with differing interstitial element configuration 3, 4 in differing parts of the surface relief structure producing differing diffraction effects in corresponding parts of the diffraction image.

It should be observed from FIG. 1 that, in this preferred embodiment, background elements 1 are not completely parallel with each other throughout the surface relief structure. They are generally parallel, in the sense that they are all generally horizontal as represented on the page, but the background elements located towards the top and bottom of the region represented clearly undulate, whereas the background grooves near the centre are relatively straight. It will further be observed that the interstitial elements show similar variations in degree of undulation. Continuous variation in terms of orientation, curvature, thickness and/or shape between interstitial and/or background elements can be a means by which image information is encoded into the surface relief structure.

Figure 2:
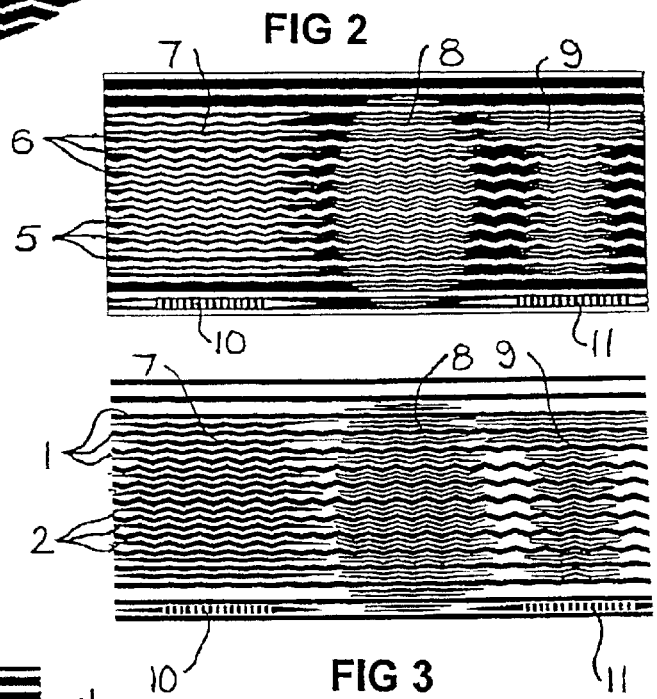
FIG. 2 is a schematic illustration of a region of surface relief structure according to an embodiment of the invention, showing various features, with the bottoms of grooves highlighted.
Figure 3:
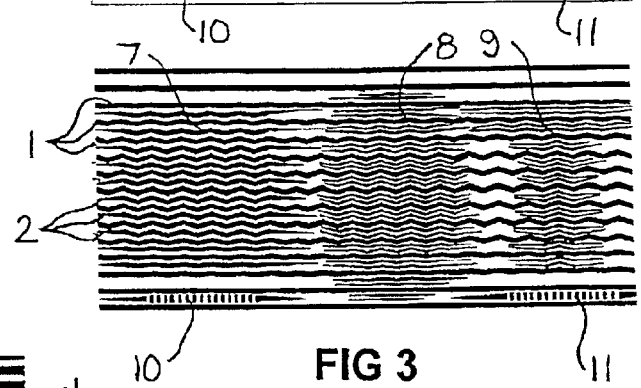
FIG. 3 shows the region of FIG. 2, but with the tops of ridges highlighted.

In the surface relief structure of FIG. 1, and in most other embodiments of the invention, it is difficult to distinguish interstitial elements from background elements This is partly because it is a preferred feature that interstitial elements be joined smoothly to adjacent interstitial elements or background elements. However, to assist in illustration of the underlying principles of the invention, FIG. 2 shows various substantially disconnected patterns of interstitial elements, with the bottoms of grooves shown in black. FIG. 3 shows the pattern of FIG. 2 with the tops of ridges shown in black.

Background grooves 1 and ridges 5 extend the whole way across the structure. Interstitial grooves 2 and ridges 6 are located between background grooves 1 and ridges 5, and they extend for shorter distances across the structure. There are five distinct regions shown on FIGS. 2 and 3, marked 7, 8, 9, 10 and 11. In region 7, there is a single interstitial groove 1 between each pair of background grooves 2. The interstitial grooves are substantially parallel to the background grooves. In regions 8 and 9, there are two interstitial grooves between each pair of background grooves, so that these regions have a higher spatial frequency than region 7. Once again, the interstitial grooves are oriented substantially parallel to the background grooves. Near the edges of each of regions 7, 8 and 9 the interstitial groove depths and widths gradually reduce to zero. This minimises diffuse scattering effects and ensures smooth connectivity between adjacent regions.

In regions 10 and 11 the interstitial grooves are oriented at right angles to the background grooves. A cross-section through the group of interstitial grooves has a periodic or sinusoidal shape of many repeating periods or oscillations. These "right-angle" interstitial elements give rise to "right angle effects", which are diffraction effects observable from viewing directions which are perpendicular to the direction from which the other effects are observable. If it is desired that effects be observable from an oblique angle, this can be accomplished by varying the angular orientation of the interstitial grooves in regions 10 and 11 relative to the background grooves.

Figure 4:
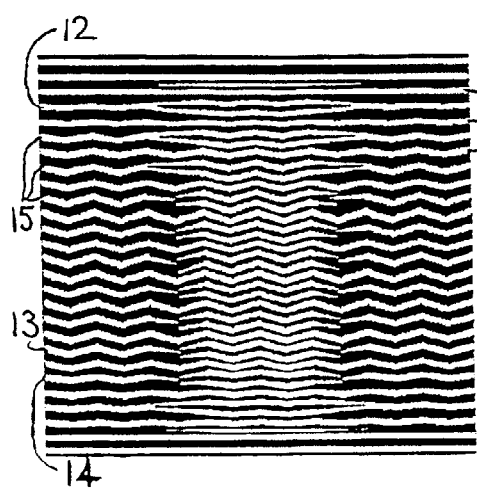
FIG. 4 is a representation of a region of surface relief structure according to the invention showing differing groove bifurcation patterns.

FIG. 4 illustrates connectivity between adjacent regions of different spatial frequency. This example shows two possible mechanisms for achieving smooth connectivity. The first is interstitial groove bifurcation, which can be seen in the interstitial grooves marked 12, 13 and 14. A single interstitial element bifurcates smoothly into two interstitial elements, and the two interstitial elements join smoothly into a single element. The second is interstitial groove depth modulation, shown in interstitial grooves 15, where the interstitial grooves smoothly reduce their height or depth and width to zero within the lower spatial frequency region.

Figure 5A:
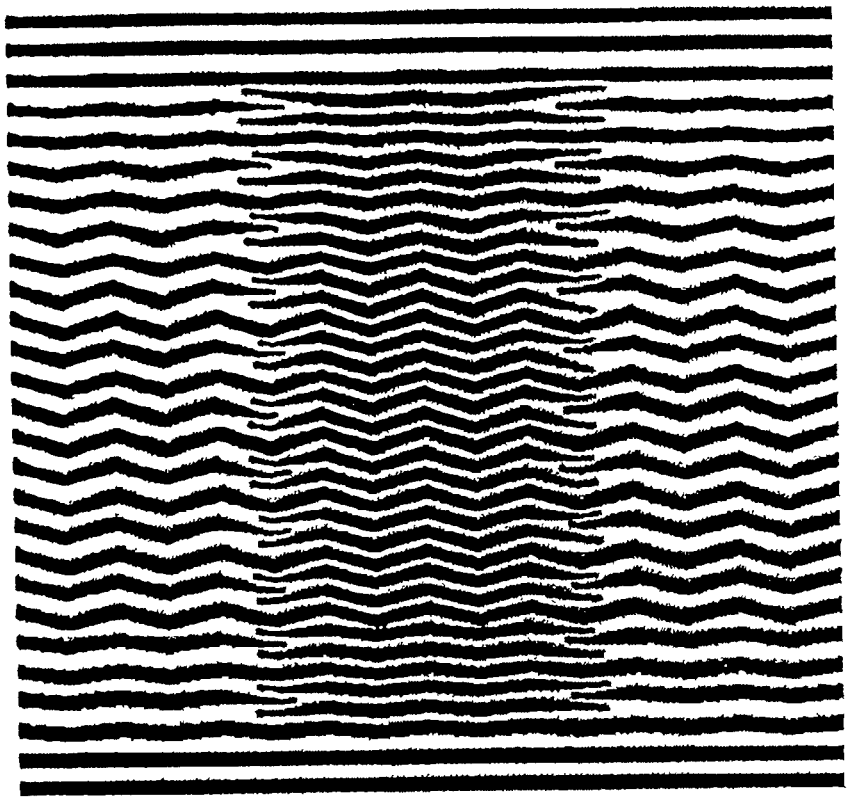
FIG. 5a is a representation of a region of surface relief structure according to the invention showing a more complex groove bifurcation pattern (tops of ridges shown in black).
Figure 5B:
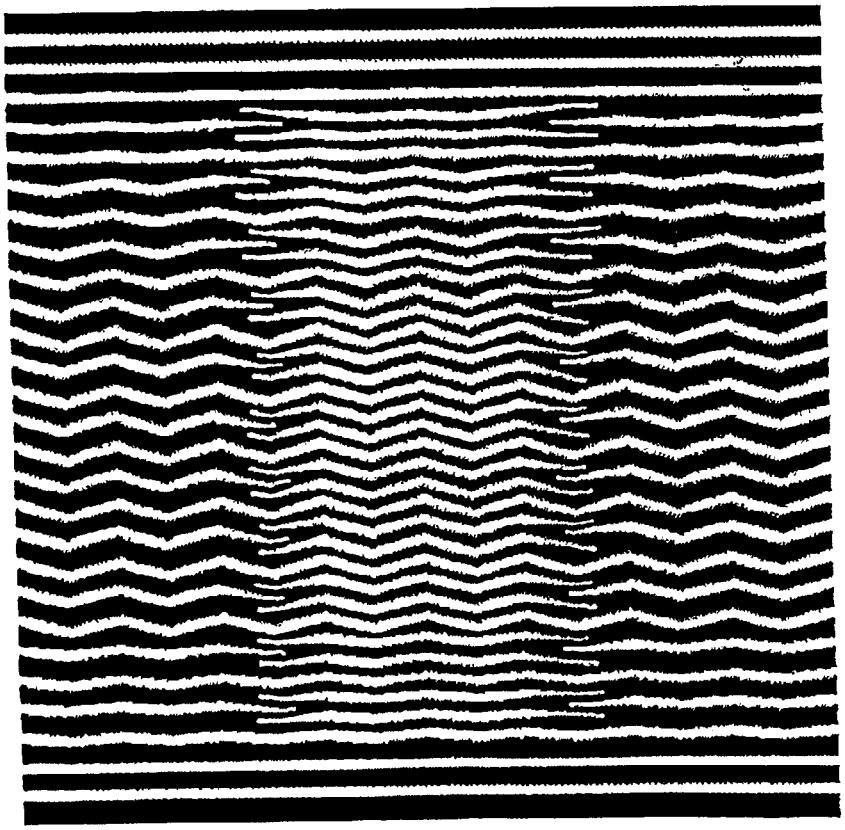
FIG. 5b shows the region of FIG. 5a with the bottoms of grooves shown in black.

FIGS. 5a and 5b show a computer calculated region of surface relief structure. The black regions in FIG. 5a correspond to the tops of ridges and the black regions in FIG. 5b correspond to the bottoms of grooves. The two figures together show how the interstitial elements in 5a appear to transform into corresponding bifurcated interstitial elements in 5b.

Figure 6A:
FIG. 6a shows a magnified view of a part of FIG. 5b.
Figure 6B:
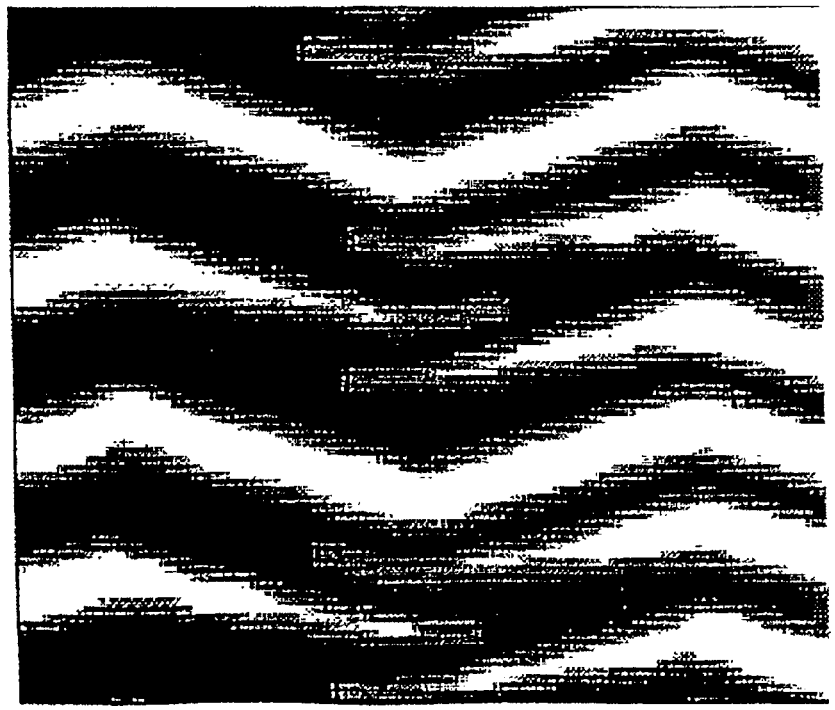

FIGS. 6a and 6b are magnified version of a small part of FIGS. 5b and 5a respectively, showing the smooth connectivity of the interstitial groove end points to the background interstitial groove regions.

FIGS. 7a to 7e and 9a and 9b illustrate this point further. FIG. 7a shows a group of interstitial elements 16 which are grooves located between background groove elements 17. Interstitial elements 16 are on the right hand side of the region of surface relief structure shown, and they taper off towards the mid-point 18. FIG. 7b shows a detail of the end of one interstitial groove 16 located between two background grooves 17. Ridge 19 branches into two separate ridges 20 and 21, with groove 16 located between them. FIGS. 7c, 7d and 7e show three cross-sections marked on FIG. 7b as A, B and C respectively. Cross-section A is taken at a point on ridge 19 before ridge 19 starts branching into two separate ridges. Accordingly, FIG. 7c shows only ridge 19 and the sidewalls of grooves 17.

Cross-section B is taken at a point where ridge 19 is just starting to branch into two separate ridges. Accordingly, FIG. 7d shows ridges 21 and 20, with a small groove 16 located between them, surrounded by background grooves 17. Cross-section C is taken at a point where branching of ridge 19 into separate ridges 21 and 20 is complete. Accordingly, FIG. 7e shows a full depth groove 16, fully separating groove branches 21 and 20. These drawings demonstrate the preferred manner in which grooves taper off, both in terms of depth and width, rather than ending abruptly, which as indicated previously can cause extraneous scattering effects.

FIGS. 9a and 9b provide similar illustrations. Ridges are represented in black, with grooves in white. FIG. 9a shows background ridges 22. Between background ridges 22 there are interstitial ridges 23, 24 and 25. Each of single ridges 23 branches into a pair of ridges 24, 25. FIG. 9b shows five cross-sections taken progressively as ridge 23 branches into ridges 24 and 25.

Although FIGS. 7a to 7e and 9a and 9b do not show other variations, it will be appreciated that similar smooth transitions are preferably applied when an interstitial element of a particular depth and width transitions into an interstitial element of a different depth and width, and where interstitial elements of particular shapes and/or curvatures and/or angular orientations transition into other interstitial elements with different shapes and/or curvatures and/or orientations.

FIG. 8 shows a collection of interstitial elements 27 joined at right angles to a background or interstitial element 26 in a comb-type configuration. This type of configuration provides an alternative to the configurations of regions 10 and 11 in FIGS. 2 and 3, for producing right-angle effects. The brightness of a right-angle effect will depend upon the amount of light diffracted by right-angle interstitial elements 27, and the right-angle effect can therefore be modulated by modulating the lengths of elements 27 as illustrated. If an oblique-angle effect is desired in place of a right-angle effect, this can be arranged by varying the angle of comb-teeth elements 27 relative to comb-backbone element 26.

FIG. 10 shows a region of surface relief structure from another embodiment of the invention. The region is approximately 50 micron in width. As is the case for the structure of FIG. 1, the background elements vary in degree of undulation. Some disconnected interstitial elements are shown.

Figure 11A:
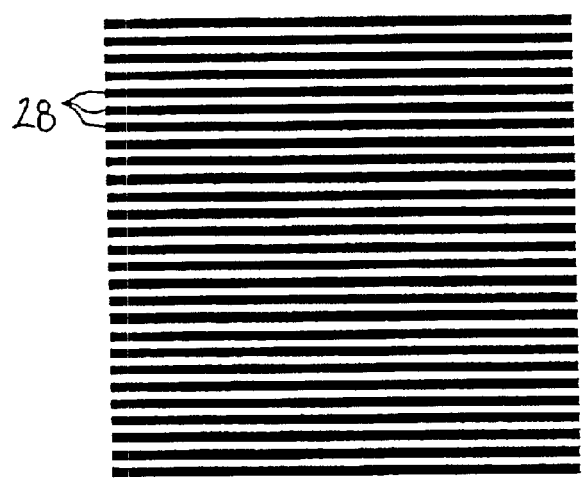
Figure 11B:
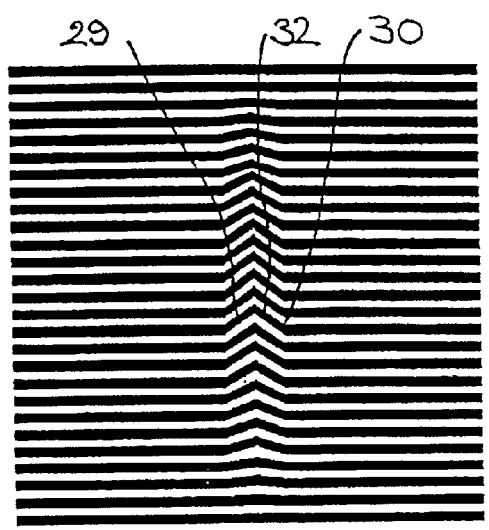

FIGS. 11a to 11d illustrate another way of adding interstitial elements to background elements. FIG. 11a shows the background elements extending horizontally across the page, parallel to each other. Each line 28 constitutes a multiplicity of continuously connected individual ridge or groove segments. FIG. 11b shows that, in order to insert an interstitial element into a background element, the background element is made discontinuous at points 29 and 30, and an interstitial element 31 is inserted into the gap. A similar operation is performed on a number of adjacent background elements, resulting in a number of adjacent interstitial elements having approximately parallel ridge or groove segments.

Figure 11C:
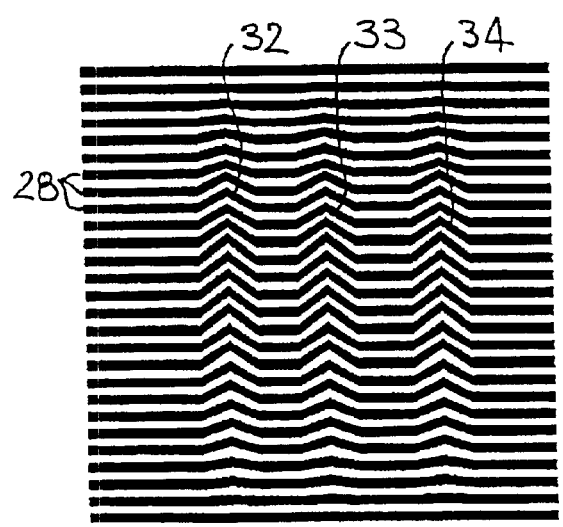
Figure 11D:
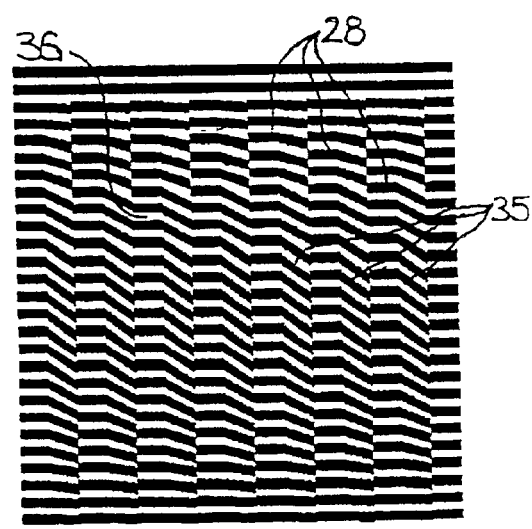

FIG. 11c shows the operation extended so that the background elements 28 have three interstitial "strip insertions" 32, 33 and 34. A further variation is shown in FIG. 11d, in which there are almost as many interstitial segments 35 as there are background segments 28. Importantly, in the configuration shown in FIG. 11d, interstitial elements often connect a discontinuity on a background element to a discontinuity on a different background element, rather than to another discontinuity on the same background element. As shown in FIG. 11d, this can result in continuous ridges or grooves 36 which are oriented at an angle to the background elements, is producing a different diffractive effect. It is desirable for grooves or ridges to be substantially continuous, as this avoids extraneous diffraction effects created by abrupt edges.

Figure 12A:
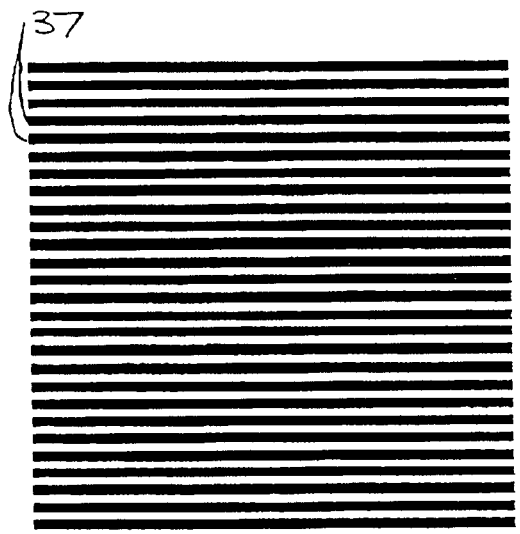
Figure 12B:
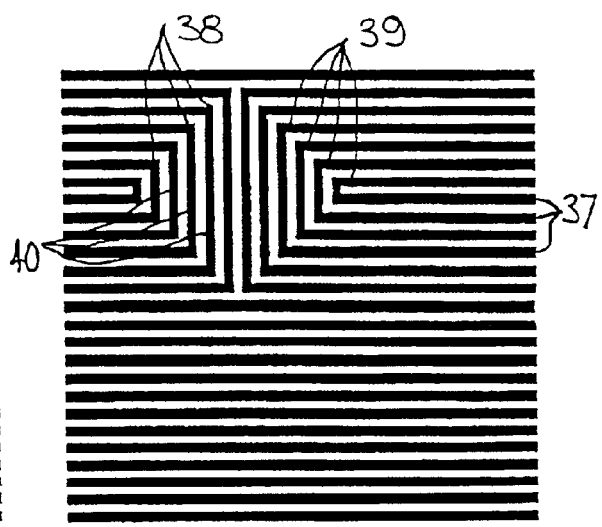

FIGS. 12a to 12d illustrate interstitial elements which are oriented generally at right angles to the general orientation of the background elements. FIG. 12a shows a plurality of generally parallel background elements 37 extending horizontally across the page. FIG. 12b shows that discontinuities have been introduced into background elements 37 at points 38 and 39. Interstitial elements 40, oriented at right angles to background elements 37 have been added into the gap, each interstitial element connecting two of discontinuities 38 or 39.

Figure 12C:
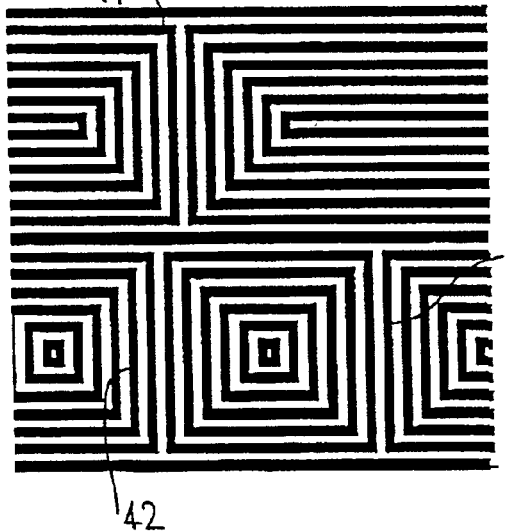
Figure 12D:
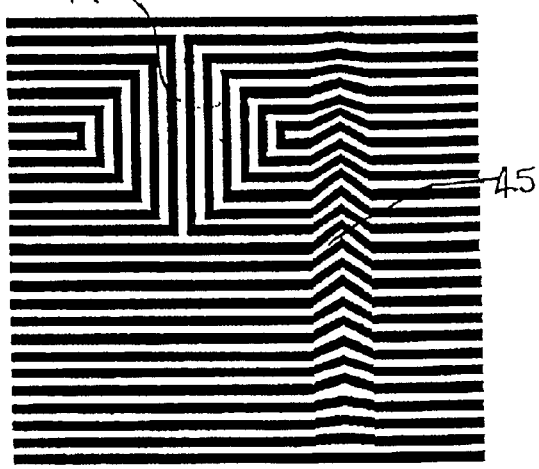

FIG. 12c shows three regions of "right angle" interstitial elements 41, 42 and 43. FIG. 12d shows a region of "right angle" interstitial elements 44 and a region 45 of a "strip element insertion".

FIGS. 13 and 14 extend the concepts shown in FIGS. 11 and 12 by showing regions which include multiple varieties of background and interstitial elements. For the sake of convenience, background elements are illustrated in each of FIGS. 11 to 14 as being generally horizontal straight lines, but it is to be understood that they may have other more complex curved or wavy configurations.

FIGS. 13 and 14 show some regions 47 in which the surface relief structure is composed entirely of background element segments, some regions 48 in which the surface relief structure is composed of background element segments interspersed with interstitial element segments, and some regions 46 in which the surface relief structure is composed entirely of interstitial elements. For the sake of convenience in designing the structure, the structure has notional square regions surrounded by background element regions 49 and 50.

FIG. 15 is a much magnified image of an actual surface relief structure according to the invention.

It will be appreciated that there are unlimited numbers of different ways in which interstitial elements can be applied in accordance with the invention. In many applications it is desirable to restrict the number of different ways in which elements are applied, so that predefined desired effects can be produced in a systematic manner. It is therefore useful to define a palette of a limited number of different interstitial element configurations. Such a palette would desirably include configurations designed to provide a variety of different grey-scale or variable image intensity effects and configurations designed to provide a variety of different colour effects. Different image intensity effects can be produced by differing lengths of interstitial elements, differing degree of curvature of interstitial elements, and/or differing widths of interstitial elements and shapes of joins between adjacent elements. Different colour effects can be produced by differing spatial frequencies of interstitial elements.

It is to be understood that various alterations, additions and modifications may be made to the parts previously described without departing from the ambit of the invention.

What is claimed is:

1. A diffractive device having a surface relief structure which, when illuminated by a light source, generates one or more diffraction images which are observable from particular ranges of viewing angles around the device, including:
   a region of diffractive structural elements, the region having a length and a width;
   background diffractive structural elements distributed over the length of the region, a plurality of the background elements having a longitudinal extent which extends throughout the width of the region; and
   a plurality of interstitial diffractive structural elements;
   the interstitial elements being interspersed between the background elements such that each of the plurality of interstitial elements are interspersed at least partially longitudinally alongside a background element or alongside another interstitial element that extends alongside a background element such that the background elements extend into and between the interstitial elements, within the region, whereby the diffractive action of the background elements is modulated by the interstitial elements, with differing interstitial element configuration in differing parts of the surface relief structure producing differing diffraction effects in corresponding parts of the diffraction images.

2. A diffractive device according to claim 1 wherein at least some of the background elements consist of a multiplicity of continuously connected individual ridge or groove segments, with ridge or groove segments in adjacent background elements being arranged in an approximately parallel configuration, and wherein at least some of the interstitial elements consist of individual or bifurcated ridge or groove segments interspersed between the background elements, with interstitial element ridge or groove segments being approximately parallel to ridge or groove segments in adjacent background elements.

3. A diffractive device according to claim 1 wherein at least some of the background elements are approximately parallel, each consisting of a plurality of discontinuous individual ridge or groove segments, and wherein at least some of the interstitial elements are approximately parallel to each other, each consisting of one or more ridge or groove segments.

4. A diffractive device according to claim 3 wherein at least some of the interstitial elements are connected smoothly at each end to a background element.

5. A diffractive device according to claim 3 including additional interstitial elements oriented generally at right-angles to the general orientation of the background elements.

6. A diffractive device according to claim 1 wherein at least some of the interstitial elements are connected smoothly to adjacent interstitial elements and/or background elements in one or more of the following ways:
   (a) a single interstitial element bifurcates smoothly into two interstitial elements;
   (b) two interstitial elements join smoothly into a single interstitial element;
   (c) an interstitial element joins smoothly into a background element;
   (d) an interstitial element of a particular depth and width transitions smoothly into an interstitial element of a different depth and width;
   (e) an interstitial element of a particular shape and/or curvature transitions smoothly into an interstitial element of a different shape and/or curvature;
   (f) an interstitial element with a particular angular orientation relative to the background elements joins smoothly to an interstitial element having a different angular orientation.

7. A diffractive device according to claim 1 wherein at least some of the background elements are connected smoothly to adjacent background elements and/or interstitial elements in one or more of the following ways:
   (a) a single background element bifurcates smoothly into two background elements;
   (b) two background elements join smoothly into a single background element;
   (c) a background element joins smoothly into an interstitial element;
   (d) a background element of a particular depth and width transitions smoothly into a background element of a different depth and width;
   (e) a background element of a particular shape and/or curvature transitions smoothly into a background element of a different shape and/or curvature;
   (f) a background element with a particular angular orientation relative to other background elements joins smoothly to a background element having a different angular orientation.

8. A diffractive device according to claim 1 wherein each of the background elements and the interstitial elements has a shape which includes one or more of the following features:

(a) a straight, curved or undulating groove;

(b) a straight, curved or undulating ridge;

(c) an array of dot-shaped indentations or protrusions; or (d) a polygonally shaped indentation or protrusion.

9. A diffractive device according to claim 1 wherein the diffraction effects observed in a particular part of the image are determined by the interstitial element configuration in a corresponding part of the surface relief structure, and the interstitial element configuration features include one or more of the following features:

(a) lengths of interstitial elements;

(b) widths of interstitial elements;

(c) depths and/or heights of interstitial elements;

(d) local spatial frequency of interstitial elements;

(e) degree of curvature of interstitial elements;

(f) shape of interstitial elements; and (g) shapes of joins between adjacent interstitial elements.

10. A diffractive device according to claim 9 which includes between background elements interstitial elements which vary continuously in terms of orientation, curvature, thickness and/or shape, the variations being a means by which image information is encoded into the surface relief structure.

11. A diffractive device according to claim 9 including additional interstitial elements arranged in a comb-like configuration, with the teeth of the comb being oriented at right angles or at an angle oblique to the general orientation of the background elements.

12. A diffractive device according to claim 9 including additional interstitial elements arranged in groups oriented at right angles or obliquely to the general orientation of the background elements, such that a cross-section through the group has a periodic or sinusoidal shape of many repeating periods or oscillations.

13. A diffractive device according to claim 9 wherein at least some interstitial element configurations are designed to create grey-scale or variable image intensity information in the image, and one or more of the following configuration features give rise to the grey-scale or variable image intensity information:

(a) lengths of interstitial elements;

(b) degree of curvature of interstitial elements;

(c) widths of interstitial elements and shapes of joins between adjacent elements;

(d) local slope or angle of interstitial elements.

14. A diffractive device according to claim 9 wherein at least some interstitial element configurations are designed to create colour information in the image.

15. A diffractive device according to claim 1 wherein the background elements include one or more of the following configurations:

(a) straight, equally spaced background elements;

(b) straight, variably spaced background elements;

(c) undulating, equally spaced background elements;

(d) undulating, variably spaced background elements;

(e) equally spaced closed or open elliptically shaped background elements;

(f) variably spaced closed or open elliptically shaped background elements;

(g) zig-zag shaped background elements of variable zig or zag angle.

16. A diffractive device according to claim 1 wherein the surface relief structure generates two or more diffraction images which are observable from different ranges of viewing angles, wherein some regions of the surface relief structure contribute to one of the images, and other regions contribute to another of the images.

17. A diffractive device according to claim 1 wherein at least some of the interstitial elements have lengths of less than 0.25 mm.

18. A diffractive device according to claim 17 wherein the background elements have lengths of greater than 0.25 mm.

19. A diffractive device according to claim 1 wherein the surface relief structure includes between background elements one or more of the following:

(a) small scale text or graphics indented into or protruding from the surface relief structure;

(b) interstitial elements consisting of parallelograms of varying angular orientations indented into the surface relief structure;

(c) diffusely reflecting randomly distributed interstitial elements;

(d) diffusely reflecting trapezoidal interstitial elements.

20. A diffractive device according to claim 1 wherein machine-readable digital information is encoded into the positioning, length, orientation and/or other physical characteristics of interstitial elements, such that the information may be read by passing a laser over the interstitial elements and analysing and decoding the reflected light.

21. A diffractive device having a surface relief structure which, when illuminated by a light source, generates one or more diffraction images which are observable from particular ranges of viewing angles around the device, including:

a region of diffractive structural elements, the region having a length and a width;

background diffractive structural elements distributed over the length of the region, a plurality of the background elements having a longitudinal extent which extends throughout the width of the region; and a plurality of interstitial diffractive structural elements;

wherein the interstitial elements are dispersed between the background elements and at least some of the plurality of interstitial elements are smoothly connected to one or more of the background elements within the region such that the diffractive action of the background elements is modulated by the interstitial elements, with differing interstitial element configurations in differing parts of the surface relief structure producing differing diffraction effects in corresponding parts of the diffraction images.

22. A diffractive device according to claim 21 wherein at least some of the background elements consist of a multiplicity of continuously connected individual ridge or groove segments, with ridge or groove segments in adjacent background elements being arranged in an approximately parallel configuration, and wherein at least some of the interstitial elements consist of individual or bifurcated ridge or groove segments interspersed between the background elements, with interstitial element ridge or groove segments being approximately parallel to ridge or groove segments in adjacent background elements.

23. A diffractive device according to claim 21 wherein at least some of the background elements are approximately parallel, each consisting of a plurality of discontinuous individual ridge or groove segments, and wherein at least some of the interstitial elements are approximately parallel to each other, each consisting of one or more ridge or groove segments and each being located in a discontinuity in a background element.

24. A diffractive device according to claim 23 wherein at least some of the interstitial elements are connected smoothly at each end to a background element.

25. A diffractive device according to claim 23 wherein at least some of the interstitial elements are oriented generally at right-angles to the general orientation of the background elements.

26. A diffractive device according to claim 21 wherein at least some of the interstitial elements are connected smoothly to adjacent interstitial elements and/or background elements in one or more of the following ways:
   (a) a single interstitial element bifurcates smoothly into two interstitial elements;
   (b) two interstitial elements join smoothly into a single interstitial element;
   (c) an interstitial element joins smoothly into a background element;
   (d) an interstitial element of a particular depth and width transitions smoothly into an interstitial element of a different depth and width;
   (e) an interstitial element of a particular shape and/or curvature transitions smoothly into an interstitial element of a different shape and/or curvature;
   (f) an interstitial element with a particular angular orientation relative to the background elements joins smoothly to an interstitial element having a different angular orientation.

27. A diffractive device according to claim 21 wherein at least some of the background elements are connected smoothly to adjacent background elements and/or interstitial elements in one or more of the following ways:
   (a) a single background element bifurcates smoothly into two background elements;
   (b) two background elements join smoothly into a single background element;
   (c) a background element joins smoothly into an interstitial element;
   (d) a background element of a particular depth and width transitions smoothly into a background element of a different depth and width;
   (e) a background element of a particular shape and/or curvature transitions smoothly into a background element of a different shape and/or curvature; (f) a background element with a particular angular orientation relative to other background elements joins smoothly to a background element having a different angular orientation.

28. A diffractive device according to claim 21 wherein each of the background elements and the interstitial elements has a shape which includes one or more of the following features:
   (a) a straight, curved or undulating groove;
   (b) a straight, curved or undulating ridge;
   (c) an array of dot-shaped indentations or protrusions; or
   (d) a polygonally shaped indentation or protrusion.

29. A diffractive device according to claim 21 wherein the diffraction effects observed in a particular part of the image are determined by the interstitial element configuration in a corresponding part of the surface relief structure, and the interstitial element configuration features include one or more of the following features:
   (a) lengths of interstitial elements;
   (b) widths of interstitial elements;
   (c) depths and/or heights of interstitial elements;
   (d) local spatial frequency of interstitial elements;
   (e) degree of curvature of interstitial elements;
   (f) shape of interstitial elements; and
   (g) shapes of joins between adjacent interstitial elements.

30. A diffractive device according to claim 29 which includes between background elements interstitial elements which vary continuously in terms of orientation, curvature, thickness and/or shape, the variations being a means by which image information is encoded into the surface relief structure.

31. A diffractive device according to claim 29 wherein at least some of the interstitial elements are oriented generally parallel to the background elements.

32. A diffractive device according to claim 29 wherein at least some of the interstitial elements are arranged in a comb-like configuration, with the teeth of the comb being oriented at right angles or at an angle oblique to the general orientation of the background elements.

33. A diffractive device according to claim 29 wherein at least some of the interstitial elements are arranged in groups oriented at right angles or obliquely to the general orientation of the background elements, such that a cross-section through the group has a periodic or sinusoidal shape of many repeating periods or oscillations.

34. A diffractive device according to claim 29 wherein at least some interstitial element configurations are designed to create grey-scale or variable image intensity information in the image, and one or more of the following configuration features give rise to the grey-scale or variable image intensity information:
   (a) lengths of interstitial elements;
   (b) degree of curvature of interstitial elements;
   (c) widths of interstitial elements and shapes of joins between adjacent elements;
   (d) local slope or angle of interstitial elements.

35. A diffractive device according to claim 29 wherein at least some interstitial element configurations are designed to create colour information in the image.

36. A diffractive device according to claim 21 wherein the background elements include one or more of the following configurations:
   (a) straight, equally spaced background elements;
   (b) straight, variably spaced background elements;
   (c) undulating, equally spaced background elements;
   (d) undulating, variably spaced background elements;
   (e) equally spaced closed or open elliptically shaped background elements;
   (f) variably spaced closed or open elliptically shaped background elements;
   (g) zig-zag shaped background elements of variable zig or zag angle.

37. A diffractive device according to claim 21 wherein the surface relief structure generates two or more diffraction images which are observable from different ranges of viewing angles, wherein some regions of the surface relief structure contribute to one of the images, and other regions contribute to another of the images.

38. A diffractive device according to claim 21 wherein at least some of the interstitial elements have lengths of less than 0.25 mm.

39. A diffractive device according to claim 38 wherein the background elements have lengths of greater than 0.25 mm.

40. A diffractive device according to claim 21 wherein the surface relief structure includes between background elements one or more of the following:

(a) small scale text or graphics indented into or protruding from the surface relief structure;
(b) interstitial elements consisting of parallelograms of varying angular orientations indented into the surface relief structure;
(c) diffusely reflecting randomly distributed interstitial elements;
(d) diffusely reflecting trapezoidal interstitial elements.

41. A diffractive device according to claim 21 wherein machine-readable digital information is encoded into the positioning, length, orientation and/or other physical characteristics of interstitial elements, such that the information may be read by passing a laser over the interstitial elements and analysing and decoding the reflected light.

* * * * *